United States Patent Office 3,242,201
Patented Mar. 22, 1966

3,242,201
EMULSIFIABLE ORGANOTIN COMPOUNDS AND
PROCESS FOR MAKING SAME
Charles Robert Cramer, Vaduz 304, Liechtenstein, and
Willem F. L. de Bruijn, Buchs, St. Gall, Switzerland
No Drawing. Filed July 16, 1963, Ser. No. 295,498
Claims priority, application Switzerland, Apr. 6, 1959,
71,590
4 Claims. (Cl. 260—414)

This invention relates to organic tin compounds, emulsifiable with water, and to a process of manufacturing the same. It is a continuation-in-part of our application S.N. 20,500, filed April 6, 1960, and now abandoned.

It is known that most organotin compounds are water-insoluble and in many instances even hydrophobic. These properties render the application of these compounds difficult when they are to be finely divided in an aqueous medium, as is the case, for instance, by application in so-called "anti-fouling paints," based on latex dispersions or as anti-sliming agent in the paper manufacture.

The object of the invention is a process for the manufacture of emulsifiable organotin compounds which comprises reacting organic tin compounds, capable of forming esters, salts, ethers or oxy-compounds, with emulsifiers, which likewise are capable of forming esters, salts, ethers or oxy-compounds, or derivatives thereof. In this manner, oily products are obtained which are emulsifiable with water in all proportions. The emulsions thus formed are stable in neutral, weakly acid and weakly alkaline media.

The reaction of the organotin compounds, capable of forming esters, salts, ethers or oxy-compounds, with emulsifiers, capable of forming esters, salts, ethers or oxy-compounds, or derivatives thereof, can be carried out in a simple manner by heating both reactants in a water-immiscible solvent which forms an azeotrope with water, and distilling the water of reaction formed together with the solvent. When organotin halide is reacted with an alkali salt of an emulsifier, the alkali halide is removed by filtration.

As organotin compounds capable of forming esters, ethers, salts or oxy-compounds, organotin halides, oxides and hydroxides can be employed which may contain alkyl-, aryl-, cycloalkyl radicals or heterocyclic radicals. The organotin compounds also can contain two to three different radicals of the kind named. As emulsifier derivatives, capable of forming esters or salts, particularly suitable are carboxylic acids or their salts combined with an alkylene oxide, e.g., ethylene oxide.

The combination of an alkylene oxide with carboxylic acids, e.g., oleic acid, is carried out in the customary manner by introducing the alkylene oxide, e.g., ethylene oxide, into the carboxylic acid in the presence of alkali or alkaline earth metals or their basic salts as catalysts.

Suitable emulsifiers forming ethers or oxy-compounds are especially polyalkylene glycols, e.g., polyethylen glycols or polypropylene glycols.

It is undestood that the emulsifiers also can contain substituents, such as sulfo groups, and others.

The most improtant usable organotin compounds and emulsifiers are listed in Table 1 below and yield compounds having the general Formulae 1 and 2, respectively:

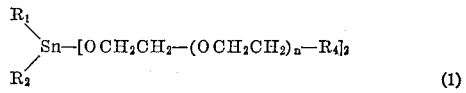
(1)

and

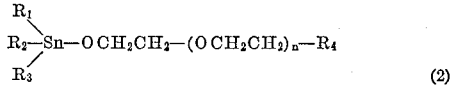
(2)

wherein, accordingly, $R_1$, $R_2$ and $R_3$ individually are alkyl and aryl radicals, $R_4$ is selected from the group consisting of a substituted or unsubstituted fatty acid radical having 8 to 20 carbon atoms, substituted phenol radicals, and polyalcohol radicals, as named in the table; $n$ is a whole number from 4 to 50.

TABLE 1

*1. Emulsifiers capable of forming esters or salts and derivatives thereof*

GROUP A: ESTER ADDUCTS (1) Aliphatic, carboxylic acids
    (a) Lauric acid
    (b) Palmitic acid
    (c) Stearic acid
    (d) Oleic acid
    (e) Tall oil fatty acids
    (f) Soyabean fatty acids
(2) Aliphatic esters of mono- to trivalent alcohols
    (a) Castor oil
    (b) Linseed oil
    (c) Sperm oil
    (d) Lanolin
(3) Aliphatic esters of tetra- and higher-valent alcohols
    (a) Monoesters, diesters and polyvalent esters of fatty acids named under (1) above with hexitols.
(4) Cyclic esters
    (a) Resins contained in tall oil

GROUP B: ALIPHATIC ETHER ADDUCTS (1) Monovalent alcohols
    (a) Lauryl alcohol
    (b) Oleyl-cetyl alcohol
    (c) Oleyl alcohol
    (d) Stearyl alcohol
    (e) Tridecyl alcohol
(2) Polyvalent alcohols
    (a) Polypropylene glycol

GROUP C: CYCLIC ETHER ADDUCTS (1) Alkylphenols
    (a) Isohexylphenol
    (b) p-Octylphenol (p-diisobutylphenol)
    (c) Octylcresol (p-diisobutylcresol)
    (d) Nonylphenol
    (e) Dodecylphenol
(2) Alkylnaphthols
    (a) Isohexylnaphthol
(3) Abietylalcohols
    (a) Hydroabietylalcohol (abitol)

GROUP D: AMIDO- AND IMIDOAZOLINE ADDUCTS (1) Acid amides
  (a) Lauryl amide
  (b) Palmityl amide
  (c) Oleyl amide
  (d) Stearyl amide
(2) Imidazolines
(3) Sulfonamides
(4) Amidoamines

GROUP E: AMINO ADDUCTS (1) Monoamines
  (a) Octylamine
  (b) Decylamine
  (c) Rosin amine
(2) Polyamines

GROUP F: THIOETHER ADDUCTS (1) Tertiary dodecylmercaptan

*II. Organotin compounds capable of forming esters, esters, salts or oxy-compounds*

(1) Di- and tri-alkyl tin oxides, hydroxides and halides.
(2) Di- and tri-alkylene tin oxides, hydroxides and halides.
(3) Di- and tri-cycloalkyl tin oxides, hydroxides and halides.
(4) Di- and tri-cycloalkenyl tin oxides, hydroxides and halides.
(5) Di- and tri-aryl tin oxides, hydroxides and halides.
(6) Di- and tri-arylene tin oxides, hydroxides and halides.
(7) Di- and tri-heterocyclo tin oxides, hydroxides and halides.
(8) Di- and tri-organotin oxides, hydroxides and halides, containing two or two to three different organic radicals.

Any of the compounds in section I can be reacted with any one of those in section II.

The invention now will be further illustrated by the following examples. However, it should be understood that these are given merely by way of explanation, not of limitation, and that numerous changes may be made in details without departing from the spirit and the scope of the invention as hereinafter claimed.

EXAMPLE 1

59.5 g. bis-tri-n-butyl tin oxide are dissolved in 250 ml. toluene and are added to 118.7 oleic acid which is combined with 6–8 mols ethylene oxide. This mixture is heated to boiling, and the water of reaction is distilled azeotropically under strong agitation.

When no more water is eliminated, the toluene is distilled off in vacuo. A yellow-brown oily liquid results which is miscible with water in all proportions.

EXAMPLE 2

224.9 g. dibutyl tin oxide are dissolved in 500 ml. toluene and are added to 1,091 g. of a tall oil fatty acid which is combined with 6–8 mols ethylene oxide. The water of reaction is distilled azeotropically as in Example 1. A yellow-brown oily liquid is obtained, which is a tin compound emulsifiable with water in all proportions.

EXAMPLE 3

800 g. bis-tribenzyl tin oxide are reacted with 1,187 g. oleic acid combined with 6–8 mols ethylene oxide. The reaction is carried out as described in Example 1.

EXAMPLE 4

317 g. dibenzyl tin oxide are reacted, as described in Example 1, with 1,187 g. oleic acid which is combined with 6–8 mols ethylene oxide.

EXAMPLE 5

58.8 g. bis-diethyl-n-octyl tin oxide are reacted, as described in Example 1, with 109.1 g. of a tall oil fatty acid which is combined with 6–8 mols ethylene oxide.

EXAMPLE 6

384 g. triphenyl tin chloride are reacted with 600 g. of the sodium salt of oleic acid which is combined with 6–8 mols ethylene oxide in 1,000 ml. toluene.

The sodium chloride eliminated is filtered, and the filtrate is freed from toluene by vacuum distillation. A brownish yellow oil remains which is a water-emulsifiable tin compound.

EXAMPLE 7

29.6 g. diethyl-n-hexyl tin chloride are reacted, as in Example 6, with 55.2 g. of the sodium salt of a tall oil fatty acid combined with 6–8 mols ethylene oxide.

EXAMPLE 8

37 g. dibenzyl tin dichloride are reacted, according to the procedure in Example 6, with 110.2 g. of the soduim salt of soyabean fatty acids which are combined with 6–8 mols ethylene oxide.

EXAMPLE 9

59.5 g. bis-tributyl tin oxide are reacted, according to the procedure described in Example 1, with 100 g. polyethylene glycol-oxalic acid monoester.

EXAMPLE 10

59.5 g. bis-tributyl tin oxide are reacted, as in Example 1, with 80 g. polyethylene glycol-400.

EXAMPLE 11

30 g. stearic acid, ethoxylated with 4 mols ethylene oxide, were dissolved in 150 ml. toluene and reacted with 10 g. bis-tri-n-butyl tin oxide. The water of reaction formed thereby was distilled together with the toluene. 38 g. of a viscous, slightly yellow liquid remained having a tin content of 9.8 percent. This liquid was emulsifiable with water to a limited extent.

EXAMPLE 12

22.2 g. polyethylene glycol monooleate having an average molecular weight of 400 were dissolved in 100 ml. toluene and reacted with 10 g. bis-tri-n-butyl tin oxide. The water of reaction formed was distilled together with the toluene. 10 g. of a yellow-brown oil were obtained having a tin content of 11.8 percent. This liquid was readily emulsifiable with water.

EXAMPLE 13

115.4 g. of an oleic acid ethoxylated with 8 mols ethylene oxide were dissolved in 250 ml. toluene and reacted with 59.5 g. bis-tri-n-butyl tin oxide. The water of reaction was distilled together with the toluene. 112 g. of a substantially colorless liquid resulted having a tin content of 19.5 percent. This was readily emulsifiable with water.

EXAMPLE 14

54.9 g. of a lauryl alcohol ethoxylated with two ethoxy groups were dissolved in 300 ml. toluene and reacted with 59.5 g. bis-tri-n-butyl tin oxide. After distillation of the water of reaction together with the solvent, 135 g. of a slightly yellow liquid were obtained having a tin content of 19.5 percent which readily emulsified with water.

EXAMPLE 15

63.7 g. of a lauryl alcohol ethoxylated with three ethoxy groups were dissolved in 300 ml. toluene and reacted with 74.2 g. bis-tri-cyclohexyl tin oxide. After distillation of the water of reaction together with the solvent, 135 g. of a slightly yellow liquid remained having a tin content of 16.9 percent which could readily be emulsified with water.

EXAMPLE 16

244 g. of an actylphenol ethoxylated with 9 mols ethylene oxide were dissolved in 150 ml. toluene and reacted with 134.8 g. bis-tri-n-butyl tin oxide. The water of reaction formed was distilled, and a practically colorless liquid, in an amount of 375 g. and a tin content of 14.3 g., was obtained which was clearly soluble in water.

We claim as our invention:

1. Emulsifiable organic tin compounds having the formulae selected from the group consisting of

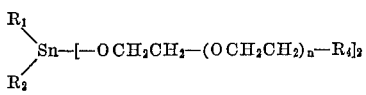

and

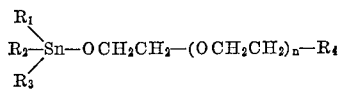

wherein $R_1$, $R_2$ and $R_3$ are alkyl, phenyl or benzyl radicals; $R_4$ is a straight chain fatty acid having 8 to 20 carbon atoms, an alkyl phenol having at least 6 carbon atoms in the alkyl, or a poly lower alkylene glycol; and wherein $n$ is a whole number from 4 to 50; said tin compounds having been obtained by the reaction of di- or tri-substituted alkyl, phenyl or benzyl tin oxides, hydroxides or chlorides, with ethoxylated fatty acids having 8 to 20 carbon atoms, ethoxylated alkyl phenols having at least 6 carbon atoms in the alkyl, ethoxylated poly lower alkylene glycols, and alkali derivatives of said acids, phenols and alkylene glycols.

2. A process for the production of emulsifiable organic tin compounds having the formulae selected from the group consisting of

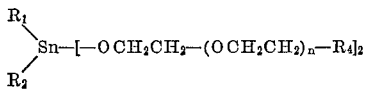

and

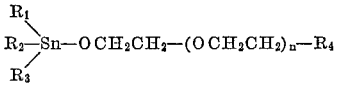

wherein $R_1$, $R_2$ and $R_3$ are alkyl, phenyl or benzyl radicals; $R_4$ is a straight chain fatty acid having 8 to 20 carbon atoms, an alkyl phenol having at least 6 carbon atoms in the alkyl, or a poly lower alkylene glycol; and $n$ is a whole number from 4 to 50; which comprises heating di- and tri-substituted alkyl, phenyl or benzyl tin oxides, hydroxides or chlorides, with ethoxylated fatty acids having 8 to 20 carbon atoms, ethoxylated alkyl phenols having at least 6 carbon atoms in the alkyl, ethoxylated poly lower alkylene glycols, or alkali salts of said acids, phenols and alkylene glycols; azeotropically distilling the same; and removing water and alkali chlorides respectively, formed in the reaction.

3. The process as defined in claim 2, wherein water formed is removed by distillation.

4. The process as defined in claim 2, wherein alkali chlorides formed are removed by filtration.

References Cited by the Examiner

FOREIGN PATENTS 1,079,329 4/1960 Germany.
842,639 7/1960 Great Britain.

CHARLES B. PARKER, *Primary Examiner.*

ANTON H. SUTTO, *Assistant Examiner.*